A. C. HARRYMAN.
AUTOMATIC WAGON BRAKE.
APPLICATION FILED AUG. 16, 1907.

922,423.

Patented May 18, 1909.

WITNESSES:
John E. Heller
Minnie C. Rollwage

INVENTOR
Arthur C. Harryman
BY
Abraham Knobel
ATTORNEY

UNITED STATES PATENT OFFICE.

ARTHUR CLARANCE HARRYMAN, OF LOUISVILLE, KENTUCKY.

AUTOMATIC WAGON-BRAKE.

No. 922,423.

Specification of Letters Patent.

Patented May 18, 1909.

Application filed August 16, 1907. Serial No. 388,844.

*To all whom it may concern:*

Be it known that I, ARTHUR CLARANCE HARRYMAN, a citizen of the United States, residing at Louisville, in the county of Jefferson and State of Kentucky, have invented a new and useful Automatic Wagon-Brake, of which the following is a specification.

This invention relates to improvements in automatic wagon brakes, and the objects of my invention are to provide a wagon brake which shall not require the attention of the driver when the wagon is moving forward, to provide a wagon brake which may be locked in an inoperative position when it is desired to back the wagon, which may be operated by hand when desired, and which shall be durable, and comparatively inexpensive to manufacture. These objects I attain by means of the mechanism illustrated in the accompanying drawing, in which—

Figure 1:
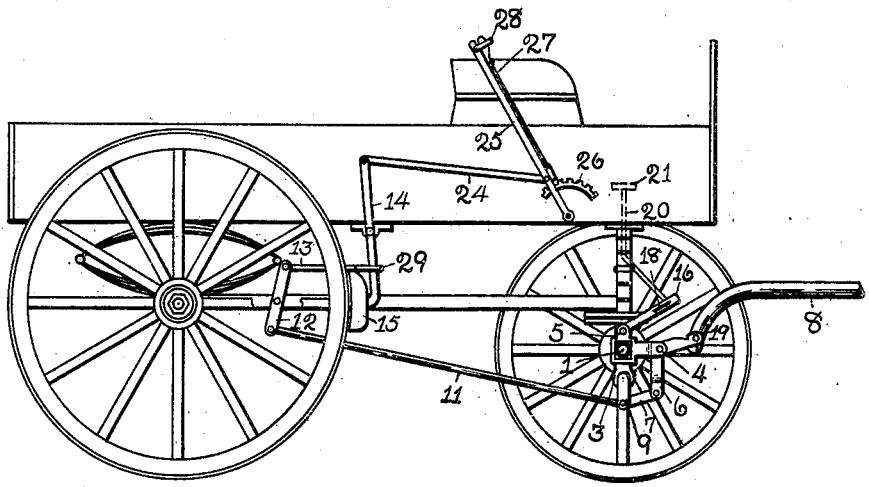
Figure 2:
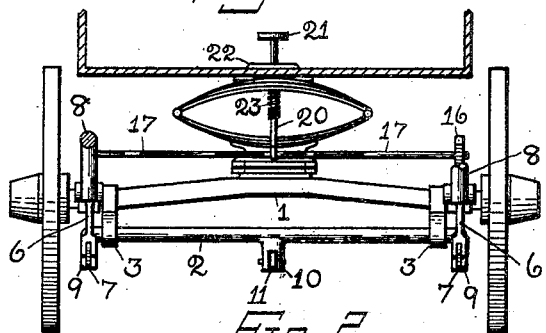

Figure 1 is a side elevation of my brake as mounted in position for use upon an ordinary one-horse wagon; Fig. 2, an end elevation; and, Fig. 3, a detail side elevation showing the wagon axle in section.

Similar reference numerals refer to similar parts throughout the several views of the drawings.

Upon the ordinary wagon axle 1, are mounted brackets, 30, each of which has a horizontal arm 4 and a vertical arm 5, and may be fixed in any desired position along the axle. The arms 4 and 5 are bifurcated to receive bell-cranks 6 and locking-bars 16 respectively. The bell-cranks 6 are fulcrumed in the arms 4 by means of bolts and are also bolted to the wagon-shafts 8 at their upper ends and to connecting-links 7 at their lower ends. A pair of links 7 serve to connect the lower ends of bell-cranks 6 with cranks 9 of a rocking bar 2. The cranks 9 of bar 2 are formed on bar 2 by turning the ends of the bar at an angle of 90 degrees. The bar 2 has a bifurcated arm 10 at its middle portion. Bar 2 is pivoted in bearings in hangers 3 which are fixed on axle 1. A rod 11 connects arm 10 with a lever 12, which, in turn, is connected with a brake-lever 14 by a connecting-rod 13. Locking-bars 16 are connected together by a bar 17. The bar 17 passes through an eye in the lower end of a pedal-stem 20, and its ends work in slots 18 in bars 16. The pedal-stem 20 is bent at a suitable angle at its lower end, passes through a bushing 22 in the floor of the wagon-bed, and is normally held in a raised position by a spring 23. A pedal 21 is fastened at the upper end of pedal-stem 20. Rod 13 is provided with an elongated loop 29 which encircles brake-lever 14 in such a manner as to permit lever 14 to move therein and the brake 15 to be applied against the wheel without moving rod 13 or any of the mechanism connected therewith. The upper end of lever 14 is connected, by a rod 24, to a lever, 25, of the usual form with usual appurtenances, such as quadrant 26, rod 27, and handle 28.

Figure 3:
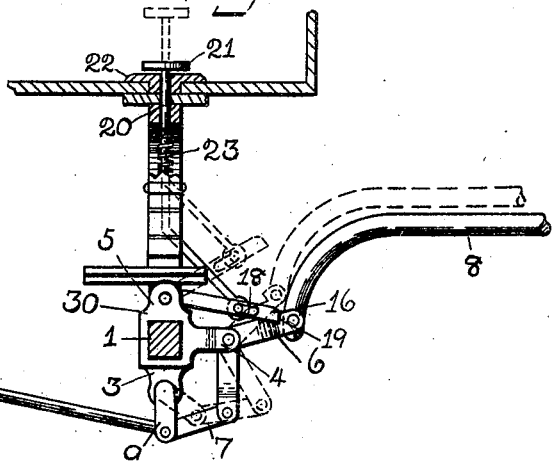

The operation of my brake is as follows:— Assuming that a wagon equipped with my brake (Fig. 1) is traveling forward and a down-grade is reached. The horse is reined back, so as to hold back the wagon. The wagon, being influenced by gravity, exerts pressure upon the shafts 8, and the shafts, by their resistance to the motion of the wagon, force the upper members of the bell-cranks 6 from the position shown in solid lines to the position shown in dotted lines (Fig. 3). In this manner the bell-cranks 6, operating through links 7, draw the cranks 9 forward, thus causing bar 2 to rock. The arm 10, being formed integral with bar 2 and parallel with cranks 9, is moved simultaneously with cranks 9 by the operation of bell cranks 6. Brake-rod 11, being connected to arm 10, is thus drawn forward and the brakes are set through the medium of lever 12, rod 13, and lever 14. The pressure exerted upon the wheels by the brake is greater or less in direct proportion to the retarding influence exerted by the horse against the momentum of the wagon.

If it is desired to back the wagon, the foot of the driver may be placed upon the pedal 13, thus, by means of the stem 20, forcing bars 16 (Fig. 3) from the position shown in dotted lines to that shown in solid lines. When bars 16 are in the above mentioned position, the wagon shafts 8 cannot operate the bell-cranks 6, and the mechanism is locked in inoperative position. The wagon may now be backed in the ordinary manner as though it were not fitted with a brake of any kind. If, while backing with the pedal 21 down and the automatic brake in an inoperative position, the driver desires to retard the backward motion of the wagon, he may use the lever 25 in the ordinary manner. The loop 29, in rod 13, permits the hand-lever brake to be used independently of the automatic mechanism.

It will be understood that normally the hand lever 25 is unlocked and may move freely as the automatic brake is thrown in and out. The had nlever and quadrant also serve another useful purpose. Should the driver desire to leave his seat and back the wagon by backing the horse by the bridle reins the lever 25 may be locked in the position shown in Fig. 1, thus rendering the automatic mechanism of the brake inoperative and serving the same purpose as the application of bars 16. Without this feature, some means for holding down the pedal 21 would have to be provided.

It will be understood that when the wagon is running on a level road or going up a hill, or, in other words, whenever the horse is pulling, the brake does not operate. It is only when it is desired to check the motion of the wagon, and the horse is required to exert a retarding influence, that the brake is automatically set to a greater or less extent, thereby assisting the horse to retard the motion of the vehicle.

It will be observed that the upper portion of stem 20 is rotatively mounted in the bushing 22 in alinement with the center of the fifth wheel, and thus the stem 20 is free to revolve and cannot be broken by turning the front axle of the wagon. It should also be observed that the brake rod 11 is very loosely mounted in bifurcated arm 10 and therefore will not be broken off when the front axle is turned.

Having thus described my invention so that any one skilled in the art pertaining thereto may make and use it, I claim—

1. Automatic brake mechanism for vehicles, comprising the usual draft-appliances, brackets mounted on the front vehicle-axle, levers fulcrumed in said brackets, one of said levers directly connected with said draft-appliances, brake-shoes at the rear wheels, means for operatively connecting said levers with said brake-shoes, locking-bars for rendering the automatic brake mechanism inoperative, means for voluntarily applying said locking-bars from the seat of the vehicle, and a hand lever operatively connected with said brake-shoes for voluntarily applying the brakes.

2. Automatic brake mechanism for vehicles, comprising the usual draft-appliances, and the usual hand-brake mechanism, brackets mounted on the front vehicle-axle, levers fulcrumed in said brackets and operatively connected with said draft-appliances and said hand-brake mechanism, locking-bars for rendering the automatic brake mechanism inoperative, means for voluntarily applying said locking-bars from the seat of the vehicle, and a hand lever operatively connected with said brake-shoes for voluntarily applying the brakes.

3. In an automatic wagon brake, the usual hand brake mechanism, a pair of hangers on the front axle, a crank bar mounted in said hangers, means connecting said crank bar and said hand-brake mechanism, a pair of brackets mounted on the front axle, bell-cranks fulcrumed in said brackets, wagon shafts attached to the upper ends of said bell-cranks, and links connecting the lower end of said bell-cranks with said crank-bar.

4. In an automatic wagon brake, the usual hand brake mechanism, a pair of hangers on the front axle, a crank bar mounted in said hangers, means connecting said crank bar and said hand-brake mechanism, a pair of brackets mounted on the front axle, said brackets having vertical and horizontal arms, bell-cranks fulcrumed in said horizontal arms, wagon shafts attached to the upper ends of said bell-cranks, links connecting the lower end of said bell-cranks with said crank-bar, locking bars fulcrumed in said vertical arms and means extending within the wagon bed for operating said locking-bars.

ARTHUR CLARANCE HARRYMAN.

Witnesses:
MINNIE C. ROLLWAGE,
DANIEL B. MEDANICH.